Figure 1:
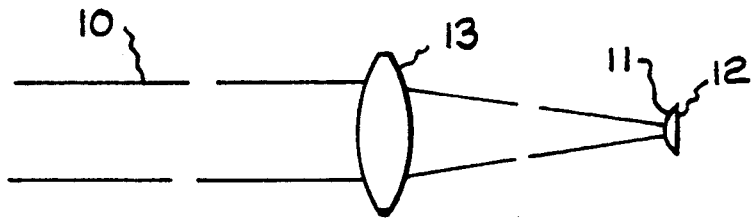

United States Patent [19]

Lunney

[11] Patent Number: 5,068,514

[45] Date of Patent: Nov. 26, 1991

[54] LASER POLISHING OF LENS SURFACE

[75] Inventor: James G. Lunney, Dublin, Ireland

[73] Assignee: Bausch & Lomb Incorporated, Rochester, N.Y.

[21] Appl. No.: 424,759

[22] Filed: Oct. 23, 1989

[30] Foreign Application Priority Data

Oct. 25, 1988 [IE] Ireland ................................. 3228/88

[51] Int. Cl.$^5$ ............................................. B23K 26/00
[52] U.S. Cl. ........................... 219/121.69; 219/121.66; 219/121.75
[58] Field of Search ........... 219/121.6, 121.85, 121.66, 219/121.68, 121.69, 121.75

[56] References Cited

U.S. PATENT DOCUMENTS 4,455,893  6/1984  Asterö ........................ 219/121.8 X
4,842,782  6/1989  Portney et al. ............ 219/121.61 X Primary Examiner—C. L. Albritton
Attorney, Agent, or Firm—Christopher E. Blank; Craig E. Larson; Salvatore P. Pace

[57] ABSTRACT

A process for polishing a contact lens surface with a laser beam without substantial ablative photodecomposition and with the fluence of the laser beam being less than $0.3 JCM^{-2}$ and the number of applied pulses greater than 200.

4 Claims, 2 Drawing Sheets

LASER POLISHING OF LENS SURFACE

The present invention relates to a process for polishing of a lens surface in particular the surface of a contact lens.

Contact lenses are usually manufactured by lathing, to required dimensions, a piece of suitable material which generally includes polymethylmethacrylate (PMMA). Following the lathing operation, the contact lens is polished using an abrasive to smooth the lathed surface. It is highly desireable that the surface of the contact lens be as smooth as possible to provide optimum optical characteristic of the contact lens, in addition to providing acceptability of the lens on the eye of a user. Polishing is usually necessary as the lathing operation introduces a certain degree of structure and roughness on the surface of the lens.

The polishing of a contact lens, as discussed above, is generally carried out manually and is thus tedious and time consuming, particularly in an environment where high volume production of contact lenses is required.

It is one object of the present invention to mitigate the above problems.

According to one aspect of the present invention there is provided a process for the smoothing of a lens surface, comprising the step of irradiating the surface of a lens with a laser beam, to cause a controlled level of melting of the lens surface, but without substantial ablative photodecomposition, whereby the surface of the lens is smoothed.

Prior to the step of irradiating the surface of the lens, the lens is cut in a conventional lathing operation.

It has been found that by irradiating the surface of a lens with a laser beam, to enable a controlled level of melting of the surface to occur, but without substantial ablative photodecomposition, the surface of the lens can be substantially smoothed. The quality of smoothness of the surface of a lens treated in this way is comparable with that obtained by manual abrasive polishing.

In a preferred form of the invention the fluence of the laser beam is preferably less than 0.3 $JCM^{-2}$ and the number of laser shots (pulses) is preferably greater than 200.

More preferably, the fluence of the laser beam is less than 0.1 $JCM^{-2}$.

While any suitable laser beam may be used of a wavelength and fluence which will result in melting of the lens surface, a UV laser operating at 193nm has been found to produce an acceptable level of smoothing.

Figure 2A:
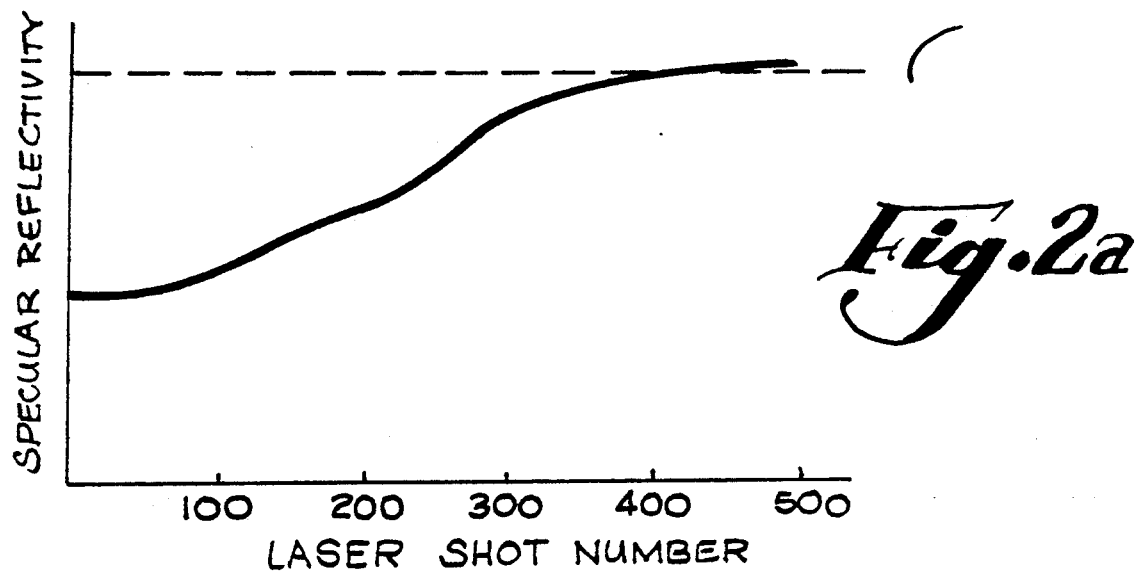
Figure 2B:
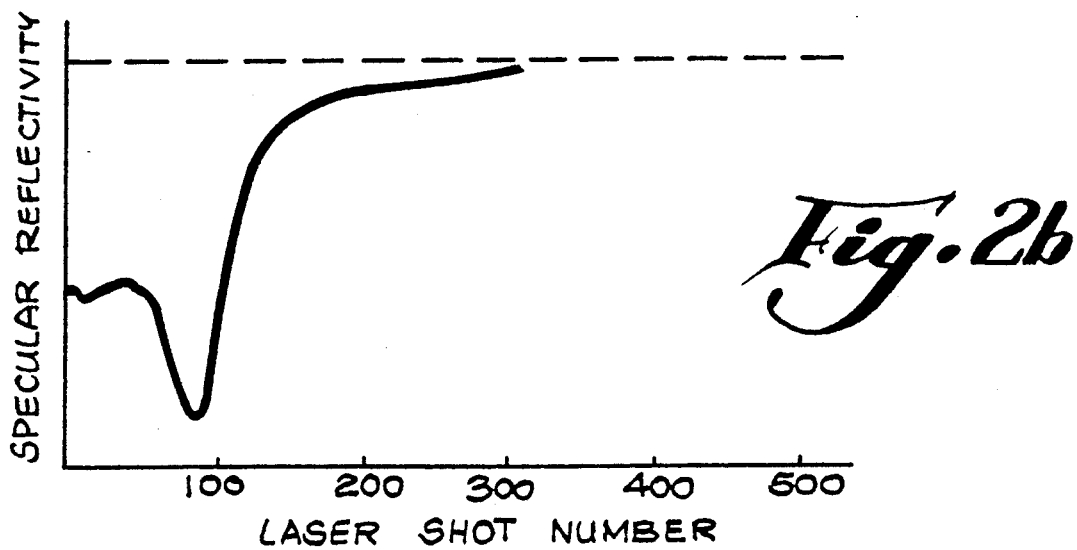
Figure 3A:
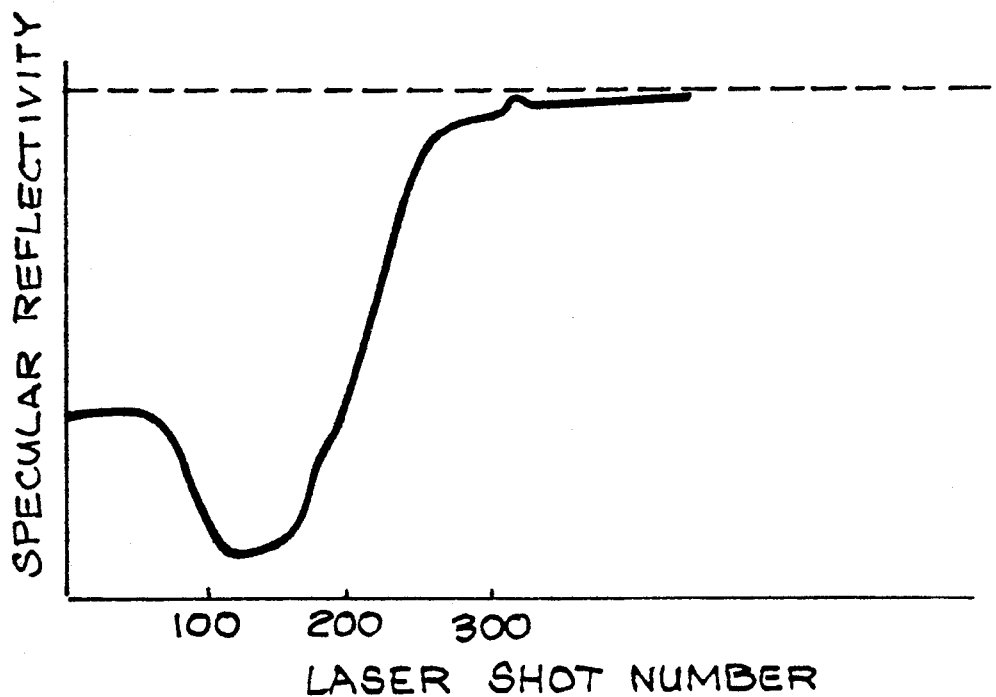
Figure 3B:
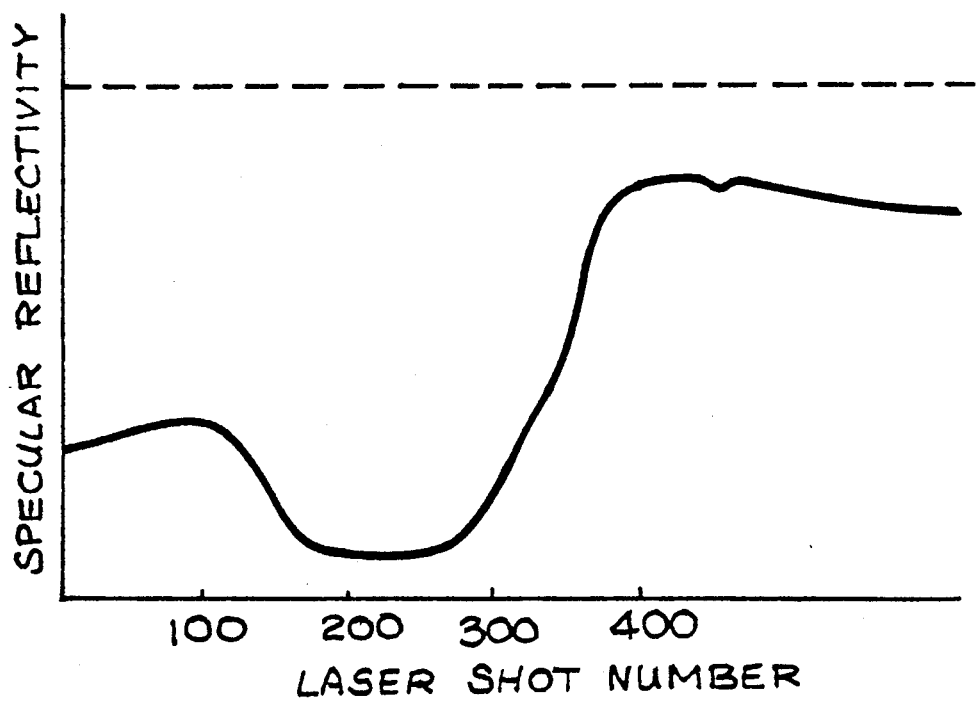

An embodiment of the invention will now be described, by way of example, with reference to the accompanying drawings, in which:

FIG. 1 is a diagrammatic view of an arrangement for carrying out the process according to the invention;

FIGS. 2a and 2b graphs illustrating the variation in specular reflectivity for laser shot number of flat lathed CONTEX buttons at 193 nm; and FIGS. 3a and 3b are graphs illustrating the variation in specular reflectivity for laser shot number of flat lathed CONTEX buttons at 248nm.

Referring now to FIG. 1 there is shown the arrangement for carrying out the process of smoothing a lens surface according to the invention. As shown, a UV laser beam 10 of wavelength 193 nm is directed onto the surface 11 of a contact lens 12. The laser used is a Lambda Physik 102 MSC excimer laser. The contact lens 12 is of the type known as CONTEX but may of course be any other known Polymer type lens, for example, Heflicon-B, Lidofilcon, Hema, or Boston IV. Each of these lenses comprises polymethylmethacrylate (PMA) as a major constituent.

A focusing lens 13 is placed in the path of the laser beam 10 to adjust the dimensions of the beam 10 where it strikes the surface 11 of the lens 12. Thus, the dimensions of the laser beam 10 where it strikes the surface 11 of the lens are approximately 4mm ×1mm depending upon the fluence required. Clearly, as the lens 12 is much larger than the dimensions of the laser beam 10, a suitable drive means (not shown) is provided either for the laser or the lens (or both) to enable the laser beam 10 to raster scan the lens surface 11.

The extent of polishing of the lens surface can be measured after or during irradiating, using the technique of specular reflection as described in the Applicant's co-pending Irish Patent Application entitled "Measuring Surface Quality of a Lens" filed simultaneously with the present Application, and the contents of which are incorporated herein by reference. The surface quality of the lens can also be measured by other means known in the art, for example using a Talyfurf or electron microscope.

EXAMPLES

As a first step, flat lathed CONTEX buttons were irradiated at 193nm at a fluence of 0.01 and 0.02 $JCM^{-2}$, and the surface quality was monitored for increasing laser shot numbers. The process was also carried out on flat lathed CONTEX buttons at a laser wavelength of 248nm at fluence values of 0.01 and 0.15 $JCM^{-2}$. The process was again carried out on CONTEX contact lenses at the same wavelengths of the laser beam, and fluence values.

FIGS. 2a and 2b illustrate the variation in specular reflectivity of lathed flat CONTEX buttons one of which was irradiated at a fluence level of 0.01 $JCM^{-2}$ and the other of which was irradiated at 0.02 $JCM^{-2}$. As shown the reflectivity of the surface rises to the same value as a manually polished lens. However, it will be appreciated that high shot numbers (laser pulses) in excess of 250 are preferably required to achieve the desired level of polishing. The visual appearance of the laser irradiated lens is suggestive of melting of the surface The temperature rise of the lens surface caused by a low fluence value of 0.02 $JCM^{-2}$ is approximately 50° C. so melting of the surface is believed to be possible at these low values of fluence The initial drop in level of specular reflectivity is thought to be due to bond breaking of the polymer before melting and flow can proceed to give a smoother surface. The etch depth was measured using interferometry and for 300 shots at 0.02 $JCM^{-2}$ was found to be about 0.6 microns i.e. 0.002 microns per pulse.

The results obtained for lathed CONTEX buttons irradiated using a laser beam of wavelength 248nm and fluence values of 0.15 and 0.1 $JCM^{-2}$, are shown in FIGS. 3a and 3b respectively. The lower fluence values of the laser beam are desireable at this wavelength since absorption of the laser energy by the CONTEX button is believed to be lower by a factor of 10 at 248nm as compared to 193nm.

Next, lathed CONTEX contact lenses were irradiated at similar laser wavelengths, fluence levels, and shot numbers and it was found that the results obtained were similar to those obtained for irradiated flat CONTEX buttons.

Thus, the UV laser irradiation of contact lenses produced by lathing, at sufficiently low values of laser fluence to cause melting of the lens surface, can provide substantially good smoothing of the lens surface, and in particular can remove structure on the lens surface caused by lathing In particular, it is believed that low fluence values of the laser beam i.e. less than 0.3 $JCM^{-2}$, result in minimal ablation of the surface of the lens, but are sufficient to cause melting of the surface, and the minimal ablation results in less laser induced modulation of the lens surface. In order to polish a complete lens surface, it will be appreciated that if the dimensions of the laser beam are much less than the dimensions of the lens, a suitable means must be provided to enable the laser beam to raster scan the lens surface.

It has been found that acceptable levels of polishing of a contact lens surface can be obtained with the Lamda excimer laser at a wavelength of 193nm with a laser fluence in the range 0.005 to 0.05 $JCM^{-2}$. At the 248nm wavelength of the laser optimum results are obtained with a laser fluence in range 0.05 to 0.2 $JCM^{-2}$.

The invention is not limited to the embodiments described herein, which may be modified or varied without departing from the scope of the invention.

I claim:

1. A process for smoothing of a lens surface, comprising the step of irradiating the surface of a lens with a laser beam, to cause a controlled level of melting of the lens surfaces, but without substantial ablative photo decomposition, whereby the surface of the lens is smoothed, and, wherein the fluence of the laser beam is less than 0.3 $3JCM^{-2}$ and the number of laser shots is greater than 200.

2. A process as claimed in claim 1 wherein the fluence of the laser beam is less than 0.1 $JCM^{-2}$.

3. A process as claimed in claim 1 wherein the lens is cut in a conventional lathing operation prior to being irradiated.

4. The process of claim 2, wherein the lens is cut in a conventional lathing operation prior to being irradiated.

* * * * *

UNITED STATES PATENT AND TRADEMARK OFFICE
CERTIFICATE OF CORRECTION

PATENT NO. : 5,068,514
DATED : November 26, 1991
INVENTOR(S) : James G. Lunney

It is certified that error appears in the above-identified patent and that said Letters Patent is hereby corrected as shown below:

Column 3, line 6, insert --.-- after the word "lathing".

Column 4, line 13, change "$3JCM^{-2}$" to --$JCM^{-2}$--.

Signed and Sealed this

Ninth Day of March, 1993

Attest:

STEPHEN G. KUNIN

Attesting Officer

Acting Commissioner of Patents and Trademarks